United States Patent [19]

Austin

[11] Patent Number: 5,388,157

[45] Date of Patent: Feb. 7, 1995

[54] DATA SECURITY ARRANGEMENTS FOR SEMICONDUCTOR PROGRAMMABLE DEVICES

[75] Inventor: Kenneth Austin, Northwich, United Kingdom

[73] Assignee: Pilkington Micro-Electronics Limited, United Kingdom

[21] Appl. No.: 957,023

[22] Filed: Oct. 6, 1992

[30] Foreign Application Priority Data

Oct. 11, 1991 [GB] United Kingdom ............... 9121591

[51] Int. Cl.6 .................................... H04L 9/00
[52] U.S. Cl. ......................... 380/4; 380/21; 380/46; 380/49; 380/50
[58] Field of Search ............ 380/3, 4, 49, 50, 59, 380/46, 21, 43

[56] References Cited

U.S. PATENT DOCUMENTS 4,262,329 4/1981 Bright et al. ................. 380/4
4,847,902 7/1989 Hampson ..................... 380/4
5,007,082 4/1991 Cummins ..................... 380/4
5,224,166 6/1993 Hartman, Jr. ................. 380/50

FOREIGN PATENT DOCUMENTS 0114522 8/1984 European Pat. Off. ..... G06F 13/00
0162707 11/1985 European Pat. Off. ..... G06F 12/14

*Primary Examiner*—Bernarr E. Gregory
*Attorney, Agent, or Firm*—Burns, Doane, Swecker & Mathis

[57] ABSTRACT

A programmable logic device comprises a semiconductor with configurable circuitry, an input circuit for encrypted data to determine the configuration of the circuitry, decrypting circuitry responsive to a key value held in a non-volatile data store, and volatile storage circuitry for holding decrypted configuration data. Encrypting circuitry uses the same key value to encrypt configuration data and stores the encrypted configuration data for use in the programmable logic device.

14 Claims, 1 Drawing Sheet

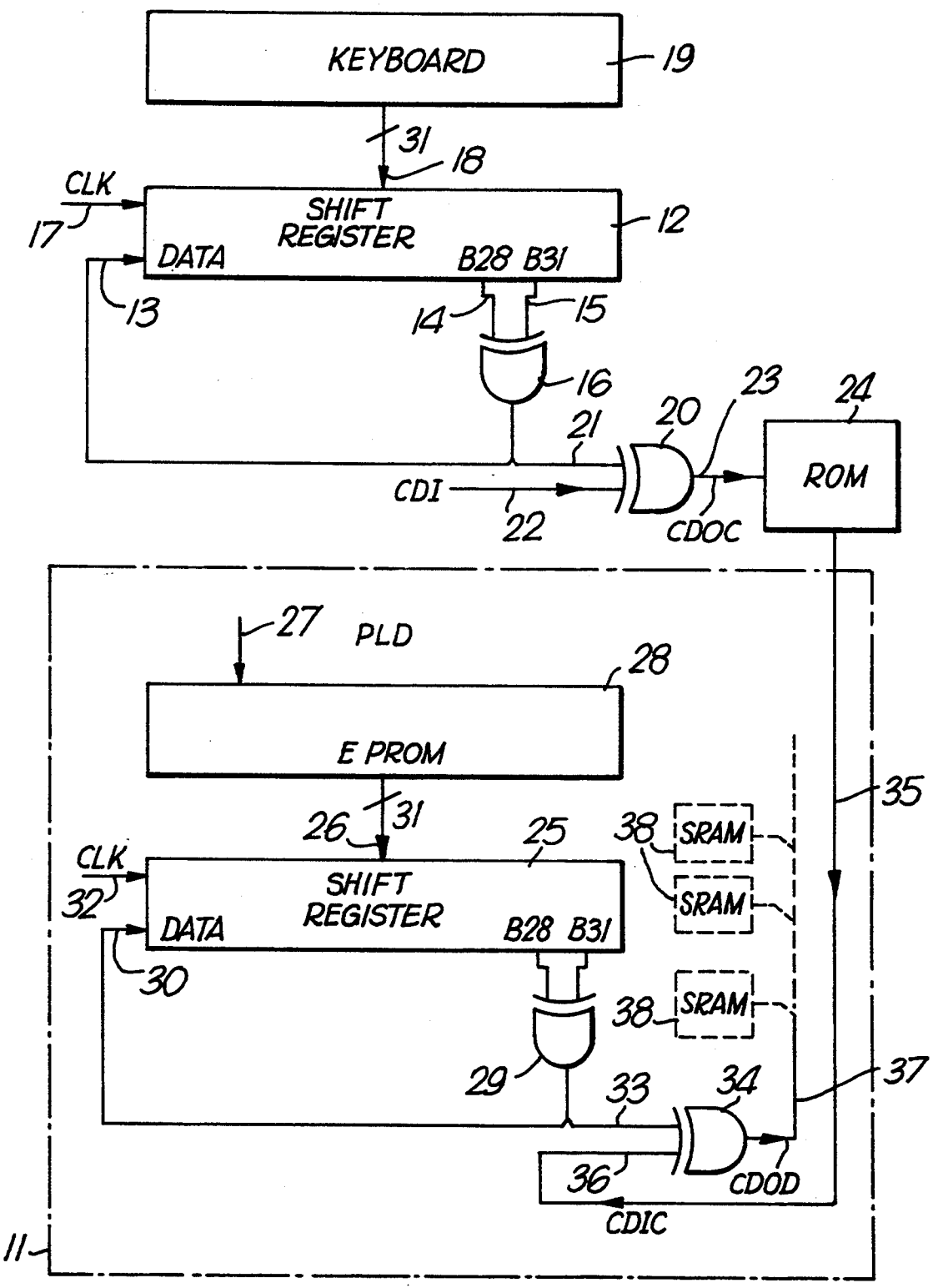

DATA SECURITY ARRANGEMENTS FOR SEMICONDUCTOR PROGRAMMABLE DEVICES

BACKGROUND OF THE INVENTION

The present invention relates to data security arrangements for semiconductor programmable logic devices.

The invention finds particular utility in semiconductor programmable logic devices (PLDs) of the type including an associated storage means e.g. a static random access memory (SRAM) in which circuit configuration data, necessary for the device to operate, is retained.

It is well known that prior to a PLD being loaded with appropriate circuit configuration data, such data is normally held in an external storage medium e.g. an erasable programmable read only memory (EPROM). A disadvantage of the present circuit configuration data loading arrangements to the PLD is that a copy can be readily taken and as a consequence valuable and sensitive circuit information can be easily and illegally duplicated. It is extremely desirable, therefore, to protect circuit information from being copied.

An aim of this invention is to overcome this disadvantage by the provision of a data security arrangement for loading configuration data which prevents illegal duplication of such circuit information.

SUMMARY OF THE INVENTION

According to the present invention, there is provided a data security arrangement for a semiconductor programmable logic device. Aspects of the invention include circuit configuration apparatus and methods for configuring the programmable logic device. Such systems may comprise data encrypting means, first storage means, and incorporated within the programmable logic device, data decrypting means together with associated second storage means, wherein the data encrypting means encrypts originating operating data, and the first storage means stores the encrypted originating operating data and wherein the data decrypting means decrypts the encrypted originating operating data read from the first storage means into the originating operating data form prior to loading to the associated second storage means.

Preferably the data encrypting means and the data decrypting means each include a pseudo-random sequence generator constituted by a 31-bit maximal length shift register having a preload input and a DATA input, the shift register generating a pseudo-random sequence equivalent to 2,147,483,647 bits in overall length.

Preferably bit 28 and bit 31 outputs of the maximal length shift register are input to an EXCLUSIVE-OR logic function whose output is connected to the DATA input of the maximal length shift register.

The maximal length shift register is preferably forced to start the pseudo-random sequence at a particular point in the sequence by the application of a predetermined sequence start encrypt constituted by a 31-bit "key value" to the preload input.

The application of the sequence start encrypt to the maximal length shift register in the data encrypting means may be input from a keyboard or from a secure file, whereas the application of the sequence start encrypt to the maximal shift register in the data decrypting means is preferably input from a non-volatile memory within the programmable logic device.

The data employed to enable the programmable logic device to operate is preferably circuit configuration data and it is arranged in the data encrypting means for the circuit configuration data and the pseudo-random sequence to be input to an EXCLUSIVE-OR logic function to provide an output of encrypted circuit configuration data.

Preferably in the data decoding means the pseudo-random sequence and the encrypted circuit configuration data are input to an EXCLUSIVE-OR logic function to provide an output of decrypted circuit configuration data.

The first storage means may be constituted by a read only memory, whereas the associated second storage means is constituted by static random access memories.

The invention will be more readily understood from the following description of an exemplary embodiment which should be read in conjunction with the accompanying drawing.

BRIEF DESCRIPTION OF THE DRAWINGS

The drawing illustrates a block schematic circuit diagram of the data security arrangements in accordance with this invention.

DESCRIPTION OF THE PREFERRED EMBODIMENT

Referring to the drawing, a programmable logic device 11 is represented by the block designated PLD. To facilitate security of data loaded to the PLD, a data encrypting means is provided to encrypt circuit configuration data, termed originating operating data, which is to be loaded to the PLD, and similarly a corresponding data decrypting means is provided in the PLD to decrypt the encrypted circuit configuration data in the PLD.

Referring to the data encrypting means in more detail, a particular form of shift register 12 is provided which generates a maximal length pseudo-random output string. This type of shift register is known as a "maximal length shift register" and in the present application the overall length of the pseudo-random sequence is arranged to be equivalent to 2,147,483,647 bits (see CMOS COOK BOOK by Don Lancaster pages 318-323, published by Howard W Sams Corp 1980).

This is achieved by feeding back to a DATA input 13 of the register, particular outputs 14 and 15 of the register in a particular manner. In this instance both outputs 14, 15 which provide bits B28 and B31 are input to an EXCLUSIVE-OR gate 16 and the output of this gate is input to the DATA input 13. Providing the register 12 is continuously driven by a clock input signal 17, the generated pseudo-random sequence is continuously repeated.

In the data encrypting means the register 12 is preloaded (in parallel form) with a predetermined one of different "key values", each of 31 bits, typically input to a preload input 18 by way of a keyboard 19 or alternatively from a secure file. The key "value" which may be termed a sequence start code, forces the shift register 12 to start the pseudo-random sequence at a particular point in the sequence and thereby recreate an identical sequence at any time as required.

The pseudo-random sequence output from the EXCLUSIVE-OR gate 16 is input at 21 to a further EXCLUSIVE-OR gate 20. Circuit configuration data CDI (generated from circuit configuration layout software) which is to be encrypted is input at 22 to the gate 20. The output 23 from the EXCLUSIVE-OR gate 20 generates encrypted circuit configuration data CDOC.

The encrypted circuit configuration data CDOC is output from gate 20 to a first storage means 24, typically, a read only memory, where it is held until required by the programmable logic device 11. The circuit configuration data now stored in the first storage medium 24 is encrypted and secure, and if copied in this form would not yield any useful circuit information to the data copier.

To make use of the circuit configuration data in the programmable logic device 11 when it is read from the first storage medium 24, the data needs to be reproduced in its original form and this is achieved by data decrypting means.

The data decrypting means is required to regenerate the same pseudo-random sequence of bits as was employed in the data encrypting means. Accordingly, the programmable logic device 11 incorporates a 31-bit maximal length shift register 25 of the same form as the register 12 employed in the data encrypting means.

For decrypting to be accurate and effective the shift register 25 must commence its pseudo-random sequence at the corresponding point at which the shift register 12 commenced its sequence. Accordingly the identical predetermined 31-bit "key-value" or sequence start encrypt which was used to start register 12 must be applied, in parallel form, to a preload input 26 of the register 25 to force it to start its sequence at the same point in the sequence as register 12, and thereby generate an identical pseudo-random sequence.

The required 31-bit "key value" is input at 27 and stored in a form of non-volatile memory on the PLD 11, for example, an EPROM 28 or fusible links.

The shift register 25 operates in a manner similar to shift register 12, the output bits B28 and B31 being input to an EXCLUSIVE-OR gate 29 whose output is fed to the DATA input 30 of the register. The register 25 is driven by the clock signal CLK input at 32.

The pseudo-random sequence output from EXCLUSIVE-OR gate 29 forms an input 33 to a further EXCLUSIVE-OR gate 34 and encrypted circuit configuration data CDIC which is output from the first storage means 24 on line 35 forms a second input 36 to the gate 34.

The EXCLUSIVE-OR function of the gate 34 upon its two signal-inputs produces an output 37, in serial form, of the originating operating data (the circuit configuration data). This originating operating data is now available for use within the programmable logic device PLD, for instance, loading into associated second storage means in the form of static random access memories SRAM 38.

I claim:

1. A programmable logic device comprising a semiconductor device having (1) configurable circuitry that configures itself in accordance with data, (2) an input circuit for receiving encrypted data, said encrypted data being used to determine configuration of said configurable circuitry, (3) decrypting circuitry connected to said input circuit to decrypt said encrypted data, (4) a non-volatile data storage device connected to said decrypting circuitry and holding a key value for use in decrypting said encrypted data, and (5) volatile storage circuitry connected both to said decrypting circuitry for receiving decrypted data from the decrypting circuitry and to said configurable circuitry whereby the configurable circuitry is configured in accordance with said decrypted data.

2. Circuit configuration apparatus comprising a programmable logic device and encrypting circuitry for providing encrypted circuit configuration data, said programmable logic device comprising a semiconductor device having configurable circuitry that configures itself in accordance with data, an input circuit for receiving encrypted data, said encrypted data being used to determine the configuration of said configurable circuitry, decrypting circuitry connected to said input circuit to decrypt said encrypted data, a non-volatile data storage device connected to said decrypting circuitry and holding a key value for use in decrypting said encrypted data, and volatile storage circuitry connected both to said decrypting circuitry for receiving decrypted data from the decrypting circuitry and to said configurable circuitry whereby the configurable circuitry is configured in accordance with said decrypted data, and said encrypting circuitry having a first input circuit for receiving a key value which is the same as said key value for the programmable logic device, a second input circuit for receiving data defining circuit configuration of the programmable logic device, an output circuit for outputting said data in encrypted form, and a storage device for storing said data in encrypted form, said storage device having output circuitry for connection to said input circuit of said programmable logic device.

3. Circuit configuration apparatus as claimed in claim 2, wherein the encrypting circuitry and the decrypting circuitry each include a pseudo-random sequence generator.

4. Circuit configuration apparatus as claimed in claim 3, wherein the pseudo-random sequence generator comprises a 31-bit maximal length shift register which generates a pseudo-random sequence that is 2,147,483,647 bits in overall length.

5. Circuit configuration apparatus as claimed in claim 4, wherein the maximal length shift register has a preloaded signal and a data input terminal.

6. Circuit configuration apparatus as claimed in claim 5, wherein bit 28 and bit 31 output terminals of the maximal length shift register are connected to an input terminal of an EXCLUSIVE-OR logic circuit whose output terminal is connected to the data input terminal of the maximal length shift register.

7. Circuit configuration apparatus as claimed in claim 5, wherein the maximal length shift register is forced to start the pseudo-random sequence at a particular point in the sequence by the application of a predetermined sequence start encrypt comprised of a 31 bit preloaded key value.

8. Circuit Configuration apparatus as claimed in claim 7, wherein the application of the sequence start code to the maximal length shift register in the encrypting circuitry is provided from a keyboard or from a secure file.

9. Circuit configuration apparatus as claimed in claim 7, wherein the application of the sequence start code to the maximal shift register in the decrypting circuitry is provided from a non-volatile memory within the programmable logic device.

10. Circuit configuration apparatus as claimed in claim 4, wherein the originating operating data is circuit configuration data and wherein in the encrypting circuitry the circuit configuration data and the pseudo-random sequence are provided to an EXCLUSIVE-OR logic circuit which produces encrypted circuit configuration data.

11. Circuit configuration apparatus as claimed in claim 10, wherein the pseudo-random sequence and the encrypted circuit configuration data are applied to an EXCLUSIVE-OR logic circuit in the decrypting circuitry to provide decrypted circuit configuration data.

12. Circuit configuration apparatus as claimed in claim 2, wherein the storage device for encrypted data comprises a read only memory.

13. Circuit configuration apparatus as claimed in claim 2, wherein the volatile storage circuitry comprises static random access memories.

14. A method of securely transferring data used for configuring a programmable logic device which method comprises encrypting configuration data by use of an encrypting key value, storing said configuration data in a data store after encryption, inputting encrypted data from said data store to a programmable logic device, deriving a decryption key value from a non-volatile store in said programmable logic device, said decryption key value being the same as said encryption key value, decrypting said data by use of said decrypting value, and storing said data after decryption in a volatile store in said programmable logic device.

* * * * *